United States Patent [19]

Crane

[11] Patent Number: 5,222,993
[45] Date of Patent: Jun. 29, 1993

[54] IGNITION SYSTEM FOR WATER-COOLED GAS ENGINES

[75] Inventor: Michael E. Crane, San Antonio, Tex.

[73] Assignee: Gas Research Institute, Chicago, Ill.

[21] Appl. No.: 952,365

[22] Filed: Sep. 28, 1992

[51] Int. Cl.$^5$ ............................. F02B 19/00
[52] U.S. Cl. ..................... 123/256; 123/DIG. 7; 123/266; 123/268
[58] Field of Search ......... 123/256, 257, 595, DIG. 7, 123/266, 253, 260, 268

[56] References Cited

U.S. PATENT DOCUMENTS

| | | | |
|---|---|---|---|
| 1,422,794 | 7/1922 | Smith | 123/256 |
| 1,877,737 | 9/1932 | Goldberg | 123/256 |
| 2,456,080 | 12/1948 | Pe | 123/143 |
| 2,991,768 | 7/1961 | Witzky | 123/256 |
| 3,066,662 | 12/1962 | May et al. | 123/143 |
| 4,124,000 | 11/1978 | Genslak | 123/32 |
| 4,125,094 | 11/1978 | Noguchi et al. | 123/32 |
| 4,126,106 | 11/1978 | Witzky | 123/DIG. 7 |
| 4,160,431 | 7/1979 | Yagi et al. | 123/75 |
| 4,175,501 | 11/1979 | Noguchi et al. | 123/32 |
| 4,218,993 | 8/1980 | Blackburn | 123/256 |
| 4,242,290 | 1/1981 | Scherenberg et al. | 123/32 |
| 4,248,192 | 2/1981 | Lampard | 123/256 |
| 4,329,956 | 5/1982 | Burgis | 123/286 |
| 4,332,223 | 6/1982 | Dalton | 123/DIG. 7 |
| 4,340,019 | 7/1982 | Bernert | 123/256 |
| 4,433,659 | 2/1984 | Burgio | 123/256 |
| 4,509,476 | 4/1985 | Breuser et al. | 123/266 |
| 4,641,616 | 2/1987 | Lampard | 123/256 |
| 4,646,695 | 3/1987 | Blackburn | 123/256 |
| 4,696,269 | 9/1987 | Blackburn | 123/256 |
| 4,744,341 | 5/1988 | Hareyama | 123/256 |
| 4,765,293 | 8/1988 | Gonzalez | 123/DIG. 7 |
| 5,069,178 | 12/1991 | Kawamura | 123/256 |
| 5,156,123 | 10/1992 | Kawamura | 123/256 |

Primary Examiner—Raymond A. Nelli
Attorney, Agent, or Firm—Baker & Botts

[57] ABSTRACT

A water-cooled, spark-ignited, natural gas burning engine that includes an improved ignition system having a pair of precombustion chambers located in series connected by an orifice from the first chamber into the combustion chamber of the engine whereby a relatively rich fuel/air mixture, ignited in the second prechamber, propagates a flame through an orifice into the first chamber wherein a leaner fuel/air mixture from the combustion chamber is plasma ignited which in turn creates a larger flame that is projected through an orifice into the main combustion chamber for plasma igniting a lean fuel/air mixture which could not otherwise be ignited by spark ignition. The invention also contemplates a kit providing the above for use in converting water-cooled, diesel burning, compression ignited engines into water-cooled, natural gas burning, spark-ignited engines.

12 Claims, 1 Drawing Sheet

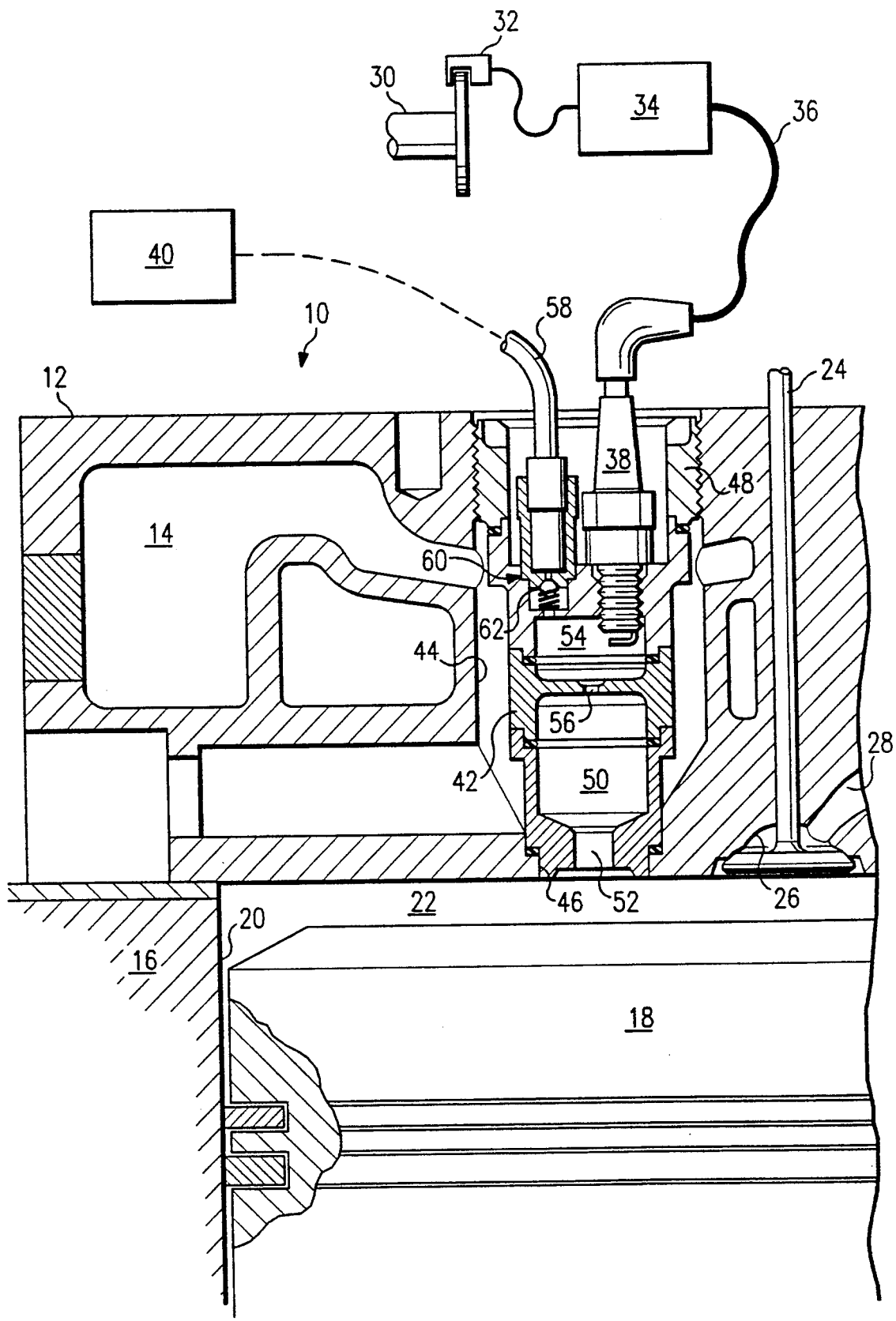

IGNITION SYSTEM FOR WATER-COOLED GAS ENGINES

TECHNICAL FIELD OF THE INVENTION

This invention relates generally to improved gas engines. More particularly, but not by way of limitation, this invention relates to a kit for converting a diesel burning, compression engine into a gas burning, spark ignition engine.

BACKGROUND OF THE INVENTION

Natural gas has become increasingly attractive as an energy source for operating engines. Natural gas as a fuel has the advantages of wide flammability limits, improved fuel economy and lower $NO_x$ emissions. With the usual gas engines, lowering of the $NO_x$ in the exhaust results in the presence of higher quantities of unburned hydrocarbons in the exhaust.

U.S. Pat. No. 1,422,794 issued to F. A. Smith on Jul. 11, 1922 illustrates an ignition device for internal combustion engines that incorporates two or more precombustion chambers somewhat similar to those proposed hereinafter. The upper chambers are provided with a spark plug and a rich fuel is supplied thereinto to assure that ignition of the fuel occurs. The flame initiated in the upper chamber is discharged into the lower chamber and subsequently into the combustion chamber of the engine to ignite the main fuel charge. The device is air cooled and is intended for use with gasoline as fuel.

U.S. Pat. No. 3,066,662 issued to C. H. May, et al. on Dec. 4, 1962 illustrates an ignition device that is very similar to that as described in the Smith patent. The purpose of the May, et al. patent is also to promote the combustion of a lean fuel in the main combustion chamber by igniting a relatively rich fuel in one of the precombustion chambers of the engine. In the precombustion chamber arrangement illustrated, two convergent/divergent nozzles are provided which together comprise a relatively long and bulky device that is located externally of the engine and, therefore, is air cooled as was the ignition device disclosed in the Smith patent.

An object of this invention is to provide an improved ignition device for spark-ignited, gas engines that can be located within the head of the engine within the confines of the water jacket for cooling purposes and that comprises a pair of precombustion chambers of generally cylindrical configuration that are separated by an orifice and have an orifice of larger size connecting the second precombustion chamber with the combustion chamber of the engine.

SUMMARY OF THE INVENTION

This invention provides an improved ignition system for water-cooled, spark-ignited, gas engine having a combustion chamber formed by a cylinder wall, a head including a water jacket, and a piston located for reciprocation in the cylinder. This system comprises a body located in the head within the water jacket wherein the body includes a first precombustion chamber adjacent to the combustion chamber and a first orifice for admitting fuel/air mixture from the combustion chamber into the first precombustion chamber. The body also includes a second precombustion chamber adjacent the first precombustion chamber and having a second orifice smaller than the first orifice providing communication between the first and second precombustion chambers. A fuel supply is connected to the body for supplying fuel/air mixture to the second precombustion chamber and ignition means is located in the body for igniting the fuel/air mixture in the second precombustion chamber.

In another aspect, the invention provides a kit for converting an engine from water-cooled, diesel burning compression ignited to water-cooled, gas burning, spark-ignited. The kit includes a body located in the water jacket in the engine and has an exterior configured to fit into an injector port in the engine. The body also includes a first precombustion chamber for location adjacent the combustion chamber in the engine and connected to the combustion chamber by a first orifice for admitting fuel/air mixture from the combustion chamber into the first precombustion chamber. A second precombustion chamber is located adjacent the first precombustion chamber and connected thereto by a second orifice smaller than the first orifice. The second orifice provides communication between the first an second precombustion chambers. The kit also includes a fuel supply connected to the body for supplying a fuel/air mixture to the second precombustion chamber and for supplying a lean fuel/air mixture to the combustion chamber and ignition means is located in the body for igniting the mixture in the second precombustion chamber.

BRIEF DESCRIPTION OF THE DRAWINGS

The foregoing and additional objects and advantages of the invention will become more apparent when the following detailed description is read in conjunction with the single figure of the drawing which shows, partly in cross-section and partly schematic a fragmentary view of an engine including an ignition system constructed in accordance with the invention.

DETAILED DESCRIPTION OF THE INVENTION

Referring to the single figure of the drawing, shown therein in fragmentary cross-section and in partial schematic is a portion of an engine 10. The portion of the engine 10 illustrated includes a head 12 having a water jacket 14 or series of passageways therein for cooling the head 12, a cylinder block 16, and a piston 18. The piston 18 is mounted for reciprocating movement in a cylinder bore 20 formed in the block 16. The piston 18, cylinder block 16 and head 12 combine to form the main combustion chamber 22. It will, of course, be understood that the engine 10 may include a plurality of the pistons 18 located in spaced bores 20.

The engine 10 also includes an inlet and outlet valve arrangement. The valve arrangement includes an inlet valve 24 that is disposed for reciprocating movement in the head 12. The inlet valve 24 is arranged to open and close a port 26 permitting a small mass of gaseous fuel to flow into the combustion chamber 22 through a passageway 28. The valve arrangement also includes an inlet valve 24 and an exhaust valve (not shown) for each piston 18. The valves are opened and closed by a cam shaft 30, which is schematically illustrated, so that the valves open and close at the appropriate time for operating the engine 10.

The rotation of the cam shaft 30 is sensed by a sensor 32 that is connected to an electronic distributor 34 which provides appropriate voltage through spark plug wires 36 to the spark plugs 38 which are arranged to ignite fuel in the combustion chamber 22 as will be described hereinafter. Distribution of the voltage to appropriate plugs is well known in the engine art. Fuel is provided through the passageway 28 at the appropriate time by a carbureted fuel system 40 that is schematically illustrated and as is also well known.

As illustrated in the figure, a spark plug 38 is mounted in a body 42 that is located in a multi-diameter bore 44 formed in the head 12. The lower end of the bore 44 is reduced in size to form a port 46 that intersects the combustion chamber 22.

The body 42 is illustrated as being formed from three parts with appropriate seals therebetween. The multiple part construction is required for manufacturing reasons.

The body 42 is retained in the head 12 by a retainer nut 48 that threads into a threaded portion of the bore 44 in the head 12. As can be seen, the lower end of the nut 48 rests on the upper end of the body 42 to hold the body 42 in the head 12. It should be pointed out that, if desired, the body 42 could be retained in the head 12 by a clamp (not shown) in a manner similar to the manner in which diesel injectors are retained in the heads of diesel engines.

The body 42 includes a first precombustion chamber 50 that is relatively short and generally cylindrical and located adjacent to the main combustion chamber 22 and is connected therewith by an orifice 52. The chamber 50 is connected to and in series with an adjacent, second precombustion chamber 54 by a much smaller orifice 56. The second chamber 54 is also relatively short and generally cylindrical. The spark plug 38 has its lower or ground electrode end disposed in the second chamber 54 for igniting fuel therein as will be described hereinafter.

Fuel is delivered into the second chamber 54 through a conduit 58 that is connected into the body 42. At the connection between the conduit 58 and the body 42, there is provided a check valve assembly 60. The check valve assembly 60 includes a spring-loaded ball 62 that permits flow through the check valve 60 into the second chamber 54 while preventing flow in the reverse direction therethrough.

As described, the engine 10 is water-cooled, spark ignited, and natural gas burning. The engine 10 may be constructed in this manner by the original equipment manufacturer. However, a water-cooled, compression ignited, diesel burning engine may be converted to a natural gas burning engine by installing in each of the cylinders of the diesel engine a kit that consists of the fuel supply system, the ignition means which includes the spark plug 38 and the distributor system 34, and the body 42. It is possible to relatively quickly, inexpensively and easily convert a diesel engine into a natural gas burning engine using the parts described above.

OPERATION

What is desired to operate the engine 10, fuel/air mixtures are provided into the second precombustion chamber 54 and through the conduit 58 and into the combustion chamber 22 through the passageway 28 in the head 12 and valve port 26 where the valve 24 is open. The fuel/air mixture being supplied through the conduit 58 is proportioned so that it can be ignited by the spark from the spark plug 38. The fuel/air mixture being introduced into the combustion chamber 22 is very fuel lean and cannot normally be ignited by the spark plug 38.

During normal engine operation, the piston 18 travels downward, creating a vacuum and causing the check ball 62 to move from its seat allowing raw, gaseous fuel to enter the second chamber 54. Simultaneously, a very lean fuel/air mixture enters the main chamber 22 as dictated by the intake valve 24. Subsequent movement of the piston 18 in the upward direction generates pressure and, with the help of the compression spring, forces the check ball 62 to reseat and seal the second chamber 54. As the piston 18 approaches top dead center, that is, as it approaches the bottom of the head 12, the fuel/air mixture supplied into the combustion chamber 22 is forced through the orifice 52 into the first precombustion chamber 50. The sensor 32 actuates the spark plug 38 through the electronic distributor 34, causing combustion in the second precombustion chamber 54 of the relatively rich fuel/air mixture therein. Upon combustion of the fuel in the second precombustion chamber 54, a highly turbulent flame is projected through the smaller orifice 56 into the first precombustion chamber 50. As previously mentioned, a lean fuel/air mixture has been moved into the first chamber 50 through the orifice 52. A large amount of turbulence in the chamber 50 caused both by the movement of the fuel into the chamber 50 and the flame projecting from the orifice 56, causes ignition and burning of the fuel in the first chamber 50.

Combustion of the fuel in the first precombustion chamber 50 creates even more turbulence and projects a flame through the larger orifice 52 into the compressed fuel in the combustion chamber 22 igniting the fuel therein. Upon ignition of the fuel in the combustion chamber 22, the piston 18 is driven downwardly, causing the engine to operate.

The ignition system described, provides a means of utilizing a small quantity of relatively rich fuel/air mixture to ignite a much larger volume of a very lean fuel/air mixture in the combustion chamber 22. Such a combustion process provides a more economically operating engine 10 as well and a substantial reduction in the $NO_x$ produced while at least maintaining the level of hydrocarbon emissions in the engine exhaust. The fast burn of the lean fuel/air mixture produced by the present invention results in shorter duration combustion and reduced hydrocarbon exhaust emissions.

It will be noted that the lower end of the spark plug 38 is positioned relatively close to the orifice 56 in the second precombustion chamber 54. It has been found that in prior structures where the second chamber is relatively long, a substantial amount of unburned fuel/air mixture is forced through the orifice into the first chamber or into the combustion chamber resulting in less efficiency and less reduction in the $NO_x$ content of the exhaust. Also, the sizing of the orifice 56 aids in creating the turbulence in the second precombustion chamber 54 and complete combustion therein during the formation and projection of the flame into the first chamber 50. Thus, forming the chambers 50 and 54 relatively short and of a generally cylindrical configuration aids in causing turbulence and complete burning during the combustion process.

From the foregoing description, it can be seen that the invention provides either an improved water-cooled, natural gas burning, spark ignited engine that has better efficiency and produces less contaminants, or a kit that can be utilized to convert a water-cooled, combustion ignited, diesel burning engine into an efficient water-cooled, natural gas burning, spark ignited engine.

A single embodiment of the invention has been described in detail. It will be understood that the embodiment is generated by way of example only and that many changes and modifications can be made thereto without departing from the spirit and scope of the invention.

What is claimed is:

1. An improved ignition system for a water-cooled, spark ignited gas engine having a combustion chamber formed by a cylinder wall, a head including a water jacket, and a piston located for reciprocation in said cylinder, said system comprising:

a body located in said head within said water jacket, said body including a first chamber adjacent to said combustion chamber and a first orifice for admitting fuel/air mixture from said combustion chamber into said first chamber, said body also including a second chamber located adjacent to said first chamber and having a second orifice smaller than said first orifice providing communication between said first and second chambers;

fuel supply means connected to said body for supplying a fuel/air mixture to said second chamber; and ignition means located in said body for igniting the fuel/air mixture in said second chamber.

2. The ignition system of claim 1 wherein said ignition means includes a spark plug.

3. The system of claim 1 wherein said chamber is smaller than said first chamber.

4. The system of claim 2 wherein said chamber is smaller than said first chamber.

5. The system of claim 1 wherein said fuel supply means includes a one-way valve permitting flow toward said second chamber and preventing flow away from said second chamber.

6. The system of claim 2 wherein said fuel supply means includes a one-way valve permitting flow toward said second chamber and preventing flow away from said second chamber.

7. In a kit for converting an engine from water-cooled, diesel burning, compression ignition to water-cooled, gas burning spark ignition, said kit including a body located within a water jacket in said engine and having:

an exterior configured to fit into an injector port in said engine;

a first chamber for location adjacent to a combustion chamber in said engine and connected to said combustion chamber by a first orifice for admitting a fuel/air mixture in said combustion chamber into said first chamber;

a second chamber for location adjacent to said first chamber and connected thereto by a second orifice smaller than said first orifice providing communication between said first and second chambers;

fuel supply means connected to said body for supplying a fuel/air mixture to said second prechamber and for supplying a lean fuel/air mixture to said combustion chamber; and ignition means mounted in said body for igniting said mixture in said second chamber.

8. The kit of claim 7 wherein said ignition means also includes a spark plug.

9. The kit of claim 7 wherein said fuel supply also includes a one-way valve permitting flow toward said second chamber and preventing flow away from said second chamber.

10. The kit of claim 8 wherein said fuel supply also includes a one-way valve permitting flow toward said second chamber and preventing flow away from said second chamber.

11. The kit of claim 7 wherein said second chamber is smaller than said first chamber.

12. The kit of claim 9 wherein said second chamber is smaller than said first chamber.

* * * * *

UNITED STATES PATENT AND TRADEMARK OFFICE
CERTIFICATE OF CORRECTION

PATENT NO. : 5,222,993
DATED : June 29, 1993
INVENTOR(S) : Crane

It is certified that error appears in the above-identified patent and that said Letters Patent is hereby corrected as shown below:

Column 2, line 19, after "between the first", delete "an" and insert --and--.

Column 2, line 21, after "supplying a", delete "fuel-" and insert --fuel--.

Column 4, line 19, after "a lean", delete "fuel-" and insert --fuel--.

Column 4, line 35, after "a very lean", delete "fuel-" and insert --fuel--.

Column 4, line 48, after "of unburned", delete "fuel-" and insert --fuel--.

Column 5, Line 3, after "ment is", delete "generated" and insert --presented--.

Column 5, line 27, after "tion", delete "means" and insert --mean--.

UNITED STATES PATENT AND TRADEMARK OFFICE
CERTIFICATE OF CORRECTION

PATENT NO. : 5,222,993
DATED : June 29, 1993
INVENTOR(S) : Crane

It is certified that error appears in the above-identified patent and that said Letters Patent is hereby corrected as shown below:

Column 5, line 28, after "wherein said", insert --second--.

Column 5, line 30, after "wherein said", insert --second--.

Column 6, line 15, after "a second chamber", delete "for location" and insert --located--.

Signed and Sealed this

Twelfth Day of July, 1994

Attest:

BRUCE LEHMAN

Attesting Officer        Commissioner of Patents and Trademarks